V. SCHMIDT.
CUTTER FOR EXCAVATORS.
APPLICATION FILED JULY 7, 1919.
1,336,657.
Patented Apr. 13, 1920.
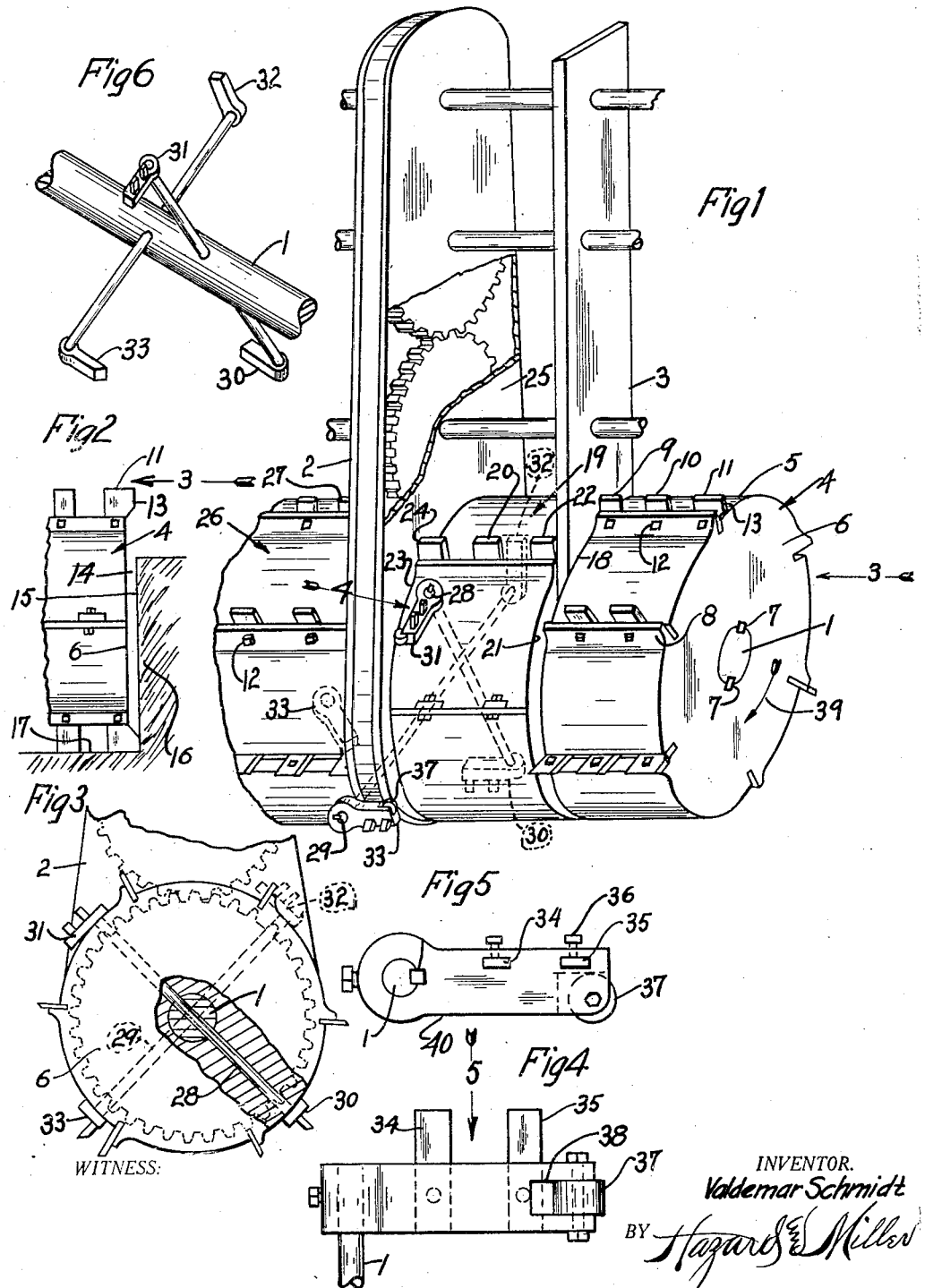
INVENTOR.
Valdemar Schmidt
BY
ATTORNEYS.

UNITED STATES PATENT OFFICE.

VALDEMAR SCHMIDT, OF LOS ANGELES, CALIFORNIA.

CUTTER FOR EXCAVATORS.

1,336,657.  Specification of Letters Patent.  Patented Apr. 13, 1920.

Application filed July 7, 1919. Serial No. 309,202.

*To all whom it may concern:*

Be it known that I, VALDEMAR SCHMIDT, a citizen of the United States, residing at Los Angeles, in the county of Los Angeles and State of California, have invented new and useful Improvements in Cutters for Excavators, of which the following is a specification.

My invention relates to cutters for road makers, graders, excavators and the like, and consists of the novel features herein shown, described and claimed.

Specifically an object of my invention is to make a cutter which will produce a square bank and make a clearance between the end of the cutter shaft or frame and the bank.

Another object of my invention is to mount a rotary cutter upon supports between the ends of the cutter and provide means for under-cutting both ways around the support to remove the rib which would otherwise be left between the cutters at the sides of the support.

Another object is to make a rotary cutter mounted upon supports in which the cutting teeth are staggered around the cutter so as to make a clean cut from one end to the other.

Figure 1 is a fragmentary perspective of a cutter embodying the principles of my invention.

Fig. 2 is a fragmentary detail showing the cutter in elevation and the bank in section and illustrating the means for cutting the clearance between the end of the cutter shaft or frame and the bank.

Fig. 3 is a fragmentary end elevation looking in the direction indicated by the arrows 3 in Figs. 1 and 2.

Fig. 4 is an elevation of one of the under-cutters, the view being taken looking in the direction indicated by the arrow 4 in Fig. 1.

Fig. 5 is a view in elevation looking in the direction indicated by the arrow 5 in Fig. 4.

Fig. 6 is a perspective of the cutter shaft and the double acting under-cutter for cutting both ways with the other parts omitted.

Referring to Figs. 1 and 2, the cutter shaft 1 is supported in bearings extending through the gear casing 2 and the thin brace 3. The end cutter has a body or frame 4 with a flat periphery 5 and a flat end face 6. The body 4 is secured to the shaft 1 by keys 7. The supporting ribs 8 project from the periphery 5. The cutter teeth 9, 10 and 11 are secured to the ribs 8 by bolts 12. The cutters 11 project radially the same as the cutters 9 and 10 and have extensions 13 projecting longitudinally and extending beyond the flat end face 6 so as to cut a clearance 14 between the end face 6 and the face 15 of the bank, and so as to make the face 15 of the bank 16 square, that is at right angles to the bottom 17 of the excavation.

The body 4 has a flat end face 18 fitting against the flat side of the thin support 3, so that the cutter 9 will cut close to the support 3. The cutter body 19 is similar to the cutter body 4, and has cutting teeth 20 similar to the cutting teeth 10, and has a flat end face 21 fitting close against the opposite side of the thin support 3 from the end face 18, and cutter teeth 22 fitting against the flat side of the thin support 3 the same as the teeth 9, and the body 19 has a flat end face 23 at the opposite end from the face 21 and cutter teeth 24 flush with the end face 23. The flat end face 23 fits close against the flat side 25 of the gear casing 2. In a like manner the cutter body 26 has a flat face fitting against the opposite side of the gear casing 2 from the face 23, and cutters 27 fitting against the flat side of the gear casing and opposite the cutters 24.

When the cutter thus constructed is operated the tendency is to leave a rib of uncut ground between the cutting teeth 24 and 27 substantially the width of the thickness of the gear casing 2, and the gear casing 2 is necessarily of considerable thickness; whereas the rib left between the cutting teeth 9 and 22 in front of the thin support 3 is insignificant.

In order to remove the rib from the front of the gear casing 2 I provide the double under-cutting mechanism shown in Figs. 1, 3, 4, 5 and 6, and the details are as follows:

A shaft 28 is rotatably mounted through the body 19 and through the shaft 1 near the end face 23, and a shaft 29 is rotatably mounted through the body 26 near the end face and through the shaft 1, the shafts 28 and 29 being at right angles to each other and on opposite sides of the gear casing 2. The under-cutting head 30 is fixed upon one end of the shaft 28 and the second under-cutting head 31 is fixed upon the other end of the shaft 28. The heads 30 and 31 being at right angles to each other.

In a like manner the heads 32 and 33 are fixed upon the ends of the shaft 29 at right angles to each other. The under-cutting teeth 34 and 35 are fixed through the heads 30, 31, 32 and 33 and held adjustably in position by set screws 36. Rollers 37 are mounted in slots 38 at the outer ends of the heads 30, 31, 32 and 33, the axes of the rollers being parallel with the axes of the shafts 28 and 29.

Referring to Fig. 1 and assuming that the shaft 1 is rotating in the direction indicated by the arrow 39, the roller 37 upon the head 31 is bearing against the near face of the gear casing 2 and the head 30 is held substantially parallel with the axis of the shaft 1 and is passing forwardly under the lower end of the gear casing 2 and upwardly, the head 32 is bearing against the farther side of the gear casing 2, and the head 33 is passing upwardly in front of the edge of the gear casing 2; as soon as the head 33 passes upwardly from the position shown in full lines to the position shown in dotted lines, the face 40 of the head will bear against the edge of the gear casing 2 and start to rotate the shaft 29, and the head 32 will pass beyond the gear casing 2 and swing into cutting position so that continued operation will cause the roller 37 of the head 33 to bear against the gear casing 2 and hold the head 32 in cutting position while it passes under the gear casing 2.

The shafts 28 and 29 being arranged at right angles to each other the heads are operated to undercut from both sides alternately so as to provide ample cutting capacity to remove the rib and prevent the rib from obstructing the forward movement of the gear casing 2.

Various changes may be made without departing from the spirit of my invention as claimed.

I claim:

1. A cutter comprising the combination with a support, of a shaft mounted in the support, a cutter body fixed upon the shaft, cutting teeth mounted upon the cutter body and having extensions projecting beyond the end face of the cutter body so as to make a square bank and provide a clearance between the face of the bank and the end of the cutter body.

2. A cutter comprising the combination with a support, of a shaft mounted in the support, a cutter body fixed upon the shaft against the support, an under-cutter shaft mounted crosswise through the cutter body and the first shaft, cutter heads fixed upon the ends of the under-cutter shaft at right angles to each other, cutting teeth carried by the cutter bodies and, rollers carried by the cutter bodies and adapted to engage the support so that when one roller is against the support the other cutting head is held to under-cut the support.

3. A cutter comprising the combination with a support having flat faces, of a shaft mounted through the support, cutter bodies fixed upon the shaft and having flat faces engaging the flat faces of the support, and an under-cutting mechanism carried by the cutter bodies and adapted to under-cut both ways under and in front of the support.

4. A cutter comprising the combination with a support having flat faces, of a shaft mounted through the support, cutter bodies fixed upon the shaft and having flat faces engaging the flat faces of the support, an under-cutter shaft mounted through one cutter body and through the main shaft, a second under-cutter shaft mounted through the other body and through the main shaft, the under-cutting shafts being at right angles to each other and on opposite sides of the support and close to the support, under-cutting heads fixed upon the ends of the under-cutting shafts, and cutting teeth carried by the under-cutting heads, so that the under-cutting heads will operate alternately to cut away the rib in front of the support.

5. A cutter comprising the combination with a support having flat faces, of a shaft mounted through the support, cutter bodies fixed upon the shaft and having flat faces engaging the flat faces of the support, an under-cutter shaft mounted through one cutter body and through the main shaft, a second under-cutter shaft mounted through the other body and through the main shaft, the under-cutting shafts being at right angles to each other and on opposite sides of the support and close to the support, under-cutting heads fixed upon the ends of the under-cutting shafts, cutting teeth carried by the under-cutting heads, and rollers carried by the under-cutting heads and adapted to engage the sides of the support.

In testimony whereof I have signed my name to this specification.

VALDEMAR SCHMIDT.